(12) United States Patent
Servedio et al.

(10) Patent No.: US 8,744,981 B1
(45) Date of Patent: Jun. 3, 2014

(54) METHOD AND APPARATUS FOR MACHINE LEARNING USING A RANDOM PROJECTION

(75) Inventors: Rocco Servedio, New York, NY (US); Philip Michael Long, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/281,099

(22) Filed: Oct. 25, 2011

Related U.S. Application Data (60) Provisional application No. 61/535,112, filed on Sep. 15, 2011.

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

2010/0198900 A1*  8/2010  Gifford .................... 708/401

OTHER PUBLICATIONS

Weston et al. "Feature Selection for SVMs", 2004, pp. 19 http://www.ee.columbia.edu/~sfchang/course/svia-F04/slides/feature_selection_for_SVMs.pdf.*
Zhou et al. "Linear programming support vector machines", Pattern Recognition, 35, 2002, pp. 2927-2936.*
Fischer et al. "An Asynchronous Parallel Newton Method", Mathematical Programming 42 (1988) 363-374.*
Arriaga, R. and Vempala, S. An algorithmic theory of learning: Robust concepts and random projection. FOCS, 1999.
Block, H. The Perceptron: a model for brain functioning. Reviews of Modern Physics, 34:123-135, 1962.
Blum, A. Random Projection, Margins, Kernels, and Feature-Selection. In LNCS vol. 3940, pp. 52-68, 2006.
Blumer, A., Ehrenfeucht, A., Haussler, D. and Warmuth, M. Learnability and the Vapnik-Chervonenkis dimension. Journal of the ACM, 36(4):929-965, 1989.
Bradley, J. K. and Schapire, R. E. Filterboost: Regression and classification on large datasets. In NIPS, 2007.
Bshouty, N. H., Goldman, S.A. and Mathias, H.D. Noise-tolerant parallel learning of geometric concepts. Information and Computation, 147(1):89-110, 1998.
Collins, M., Schapire, Robert E. and Singer, Y. Logistic regression, adaboost and bregman distances. Machine Learning, 48(1-3):253-285, 2002.
Domingo, C. and Watanabe, O. MadaBoost: a modified version of AdaBoost. In COLT, 2000.
Freund, Y. Boosting a weak learning algorithm by majority. Information and Computation, 121(2):256-285, 1995.
Freund, Y. An adaptive version of the boost-by-majority algorithm. Machine Learning, 43(3):293-318, 2001.

(Continued)

*Primary Examiner* — Li-Wu Chang
(74) *Attorney, Agent, or Firm* — Young Basile Hanlon & MacFarlane P.C.

(57) ABSTRACT

A method and apparatus is disclosed for machine learning an unknown n-dimensional γ-margin halfspace. The method and apparatus can be implemented using parallel processing. In one embodiment, the method includes generating a random d-dimensional projection of the set of examples. The random projection is generated by rounding the examples, taking a projection and then rounding the results. A set of m examples are drawn from the d-dimensional projection. Linear programs are then solved with m constraints based on the m examples using multiple stages of Newton's method. Parallel algorithms for linear algebra can be used to carry out at least some stages of Newton's method.

20 Claims, 6 Drawing Sheets

(56) References Cited

OTHER PUBLICATIONS

Greenlaw, R., Hoover, H.J. and Ruzzo, W.L. Limits to Parallel Computation: P-Completeness Theory. Oxford University Press, New York, 1995.

Kalai, A. and Servedio, R. Boosting in the presence of noise. Journal of Computer & System Sciences, 71 (3):266-290, 2005.

Karmarkar, N. A new polynomial time algorithm for linear programming. Combinatorica, 4:373-395, 1984.

Kearns, M. and Mansour, Y. On the boosting ability of top-down decision tree learning algorithms. In STOC, 1996.

Kearns, M. and Vazirani, U. An Introduction to Computational Learning Theory. MIT Press, 1994.

Long, P. and Servedio, R. Martingale boosting. In Proc. 18th Annual Conference on Learning Theory (COLT), pp. 79-94, 2005.

Long, P. and Servedio, R. Adaptive martingale boosting. In Proc. 22nd Annual Conference on Neural Information Processing Systems (NIPS), pp. 977-984, 2008.

Mansour, Y. and McAllester, D. Boosting using branching programs. Journal of Computer & System Sciences, 64 (1):103-112, 2002.

Reif, John H. Efficient Parallel Factorization and Solution of Structured and Unstructured Linear Systems, Journal of Computer and System Sciences, 2005.

Renegar, J. A polynomial-time algorithm, based on Newton's method, for linear programming. Mathematical Programming, 40:59-93, 1988.

Rosenblatt, F. The Perceptron: a probabilistic model for information storage and organization in the brain. Psychological Review, 65:386-407, 1958.

Schapire, R. The strength of weak learnability. Machine Learning, 5(2):197-227, 1990.

Servedio, R. Smooth boosting and learning with malicious noise. Journal of Machine Learning Research. 4:633-648, 2003.

Valiant, L. A theory of the learnable. Communications of the ACM, 27(11):1134-1142, 1984.

Vitter, J.S. and Lin, J. Learning in parallel. Inf. Comput., 96(2):179-202, 1992.

DIMACS 2011 Workshop. Parallelism: A 2020 Vision, 2011.

NIPS 2009 Workshop. Large-Scale Machine Learning: Parallelism and Massive Datasets, 2009.

Schapire, Robert E., The Boosting Approach to Machine Learning an Overview, MSRI Workshop on Nonlinear Estimation and Classification, 2002 (23 pp).

\* cited by examiner

FIG. 2

| EXAMPLE | $F_1$ | $F_2$ | $F_3$ | $F_4$ | $F_5$ | ○ ○ ○ | $F_n$ | LABEL |
|---|---|---|---|---|---|---|---|---|
| $x_1$ | 1.245 | 5.454 | -5.571 | 6.415 | -2.145 | | 4.878 | NOT"A" |
| $x_2$ | 6.548 | -3.215 | 2.155 | 6.958 | 4.154 | | -7.458 | NOT"A" |
| $x_3$ | 7.950 | 6.717 | -8.607 | -9.658 | 5.571 | | -8.010 | "A" |
| $x_4$ | 7.793 | -7.238 | 5.147 | 8.365 | 6.003 | | -2.149 | NOT"A" |
| | | | ○ | ○ | ○ | | | |
| $x_{N-1}$ | -0.175 | 1.783 | 3.154 | 7.160 | 0.751 | | 6.714 | "A" |
| $x_N$ | 7.282 | 0.24 | 4.484 | 8.244 | -5.454 | | 9.848 | NOT"A" |

METHOD AND APPARATUS FOR MACHINE LEARNING USING A RANDOM PROJECTION

CROSS-REFERENCE TO RELATED APPLICATIONS

This application claims priority to U.S. Provisional Patent Application No. 61/535,112, filed Sep. 15, 2011, which is hereby incorporated by reference in its entirety.

TECHNICAL FIELD

The present invention relates to the field of machine learning generally and in particular to machine learning using parallel processing.

BACKGROUND

Machine learning seeks to permit computers to analyze known examples that illustrate the relationship between outputs and observed variables. One such approach is known as Probably Approximately Correct learning or "PAC" learning. PAC learning involves having a machine learner receive examples of things to be classified together with labels describing each example. Such examples are sometimes referred to as labeled examples. The machine learner generates a prediction rule or "classifier" (sometimes referred to as a "hypothesis") based on observed features within the examples. The classifier is then used to classify future unknown data. One illustrative application of machine learning is speech recognition. When machine learning is applied to this application, the labeled examples might include a large number of sound samples. Each sound sample is drawn from a human speaker and contains one or more features. The features might be attributes of the signal (or in some cases a transform of the signal) such as amplitude for example. Each sample is given a label by human reviewers, such as a specific phoneme or word heard by the reviewer when the sound is played. Thus, if a sample were that of a person uttering the word "cat" then the label assigned to the sample would be "cat." The goal of machine learning is to process the labeled examples to generate classifiers that will correctly classify future examples as the proper phoneme or word within an acceptable error level.

A boosting algorithm is one approach for using a machine to generate a classifier. Various boosting algorithms are known including MadaBoost and AdaBoost. Boosting algorithms in some cases involve repeatedly calling a weak learner algorithm to process subsets of labeled examples. These subsets are drawn from the larger set of labeled examples using probability distributions that can vary each time the weak learner is called. With each iteration, the weak learner algorithm generates a classifier that is not especially accurate. The boosting algorithm combines the classifiers generated by the weak algorithm. The combination of classifiers constitutes a single prediction rule that should be more accurate than any one of the classifiers generated by the weak learner algorithm.

SUMMARY

Disclosed herein are embodiments of techniques for machine learning. One aspect of the disclosed embodiments is a technique for generating a classifier using n-dimensional examples in a dataset. The technique includes storing in a computer memory at least some of the n-dimensional examples. A random projection of the n-dimensional examples generates a transform of d-dimensional examples. A set of examples is then drawn from the d-dimensional examples. Using at least one processor, a linear program operation is performed using as constraints at least some of the set of examples drawn from the plurality of d-dimensional examples. A classifier is generated based on the solution of the at least one linear program operation.

Another aspect of the disclosed embodiments is a machine for generating a classifier from n-dimensional examples in a dataset. The machine includes a memory and a computing system having at least one processor. Some of the n-dimensional examples are stored in the memory. The computing system is configured to determine d-dimensional examples using a random projection of n-dimensional examples stored in memory. In some cases, d is less than n. The computing system is further configured to draw a set of examples from the d-dimensional space. Using some of the d-dimensional examples as constraints, the computing system solves at least one linear program operation. The computing system then generates a classifier based on the solution of the at least one linear program operation.

Another aspect of the disclosed embodiments is a computer storage medium encoded with a computer program. The computer program has instructions that, when executed by a data processing apparatus, cause the data processing apparatus to perform operations. These operations include storing in a computer memory at least some of the n-dimensional examples and determining a d-dimensional space using a random projection of the at least some n-dimensional examples. In some cases, d is less than n. The operations further include drawing a set of examples from the d-dimensional space and solving at least one linear program operation. The linear program operation is solved using constraints which are based on at least some of the set of examples drawn from the d-dimensional space. A classifier is generated based on the solution of the at least one linear program.

BRIEF DESCRIPTION OF THE DRAWINGS

The description herein makes reference to the accompanying drawings wherein like reference numerals refer to like parts throughout the several views, and wherein.

DETAILED DESCRIPTION

In the embodiments below, a method (and an apparatus for implementing the method) is disclosed for machine learning that facilitates the use of parallel processing.

Figure 1:
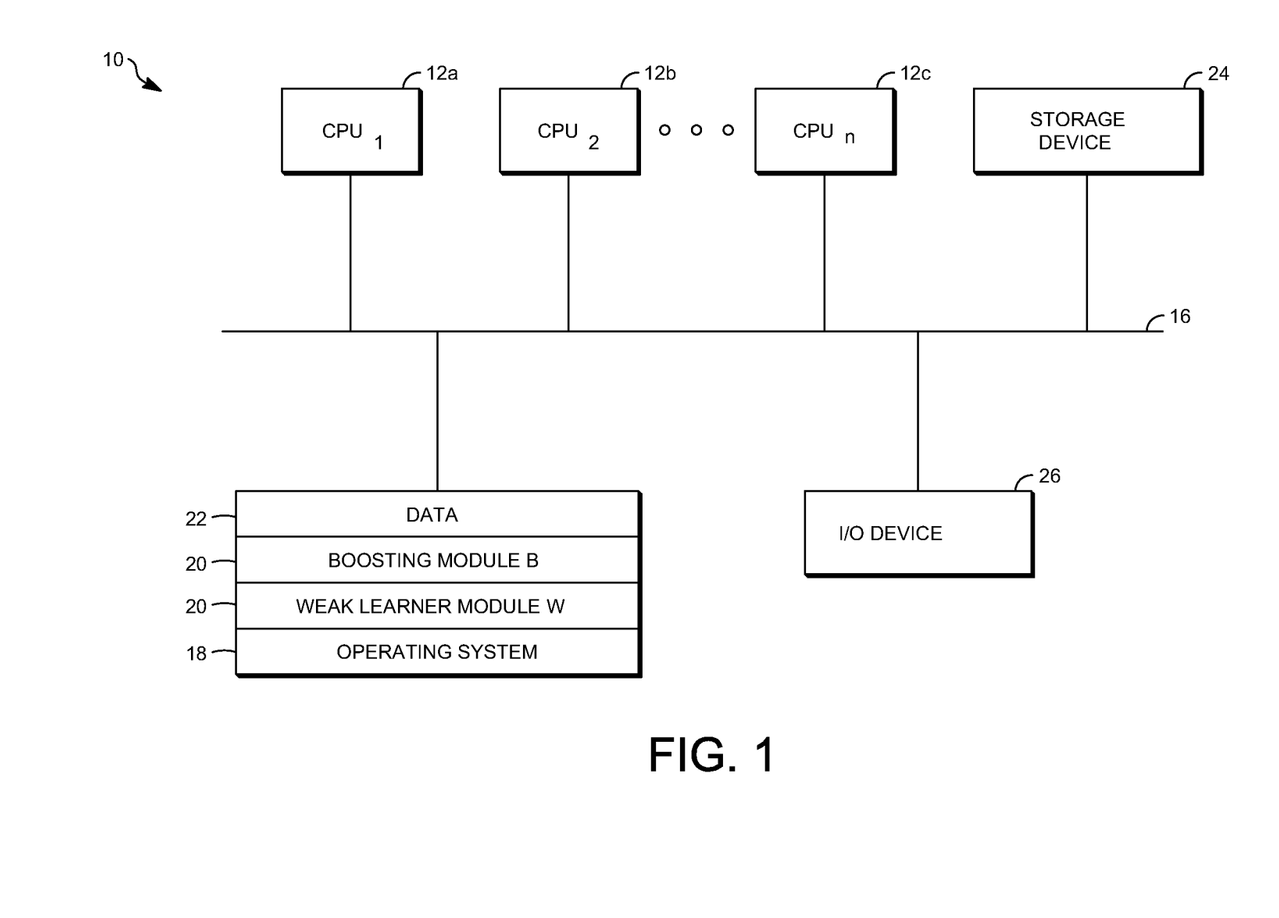
FIG. 1 is a block diagram of a machine learning system according to an embodiment of the described subject matter.

FIG. 1 is a block diagram of a machine learning system 10. Machine learning system 10 includes a data processing apparatus which in this case has a plurality of parallel processors including processors 12a through 12c (referred to generally as processors 12) and a memory 14. Processors 12 are conventional central processing units but can be any other type of device capable of manipulating or processing information now-existing or hereafter developed, including for example optical processors, quantum and/or molecular processors, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any of the foregoing, either singly or in combination. Although advantages in speed and efficiency can be achieved using more than one processor 12, the disclosed embodiments can be practiced with a single processor.

Memory 14 is random access memory (RAM) although any other suitable type of storage device can be used. Memory 14 includes code and data that is accessed by processor 12 using a bus 16. Memory 14 includes an operating system 18, application programs 20 (including programs that permit processor 12 to perform the methods described herein), and dataset 22 (including the examples used for machine learning and the classifiers generated as a result of machine learning). Machine learning system 10 also includes secondary storage 24, which can be a disk drive. Because the example sets used for machine learning contain a significant amount of information, the example sets can be stored in whole or in part in secondary storage 24 and loaded into memory 14 as needed for processing. Machine learning system 10 includes input-output device 26, which is also coupled to processor 12 via bus 16. Input-output device 26 can be a display or other human interface that permits an end user to program and otherwise use machine learning system 10.

Although FIG. 1 depicts that processors 12 and memory 14 are integrated into a single unit, this depiction is exemplary only. The operations of processors 12 can be distributed across multiple machines (each machine having one or more of processors 12), which can be coupled directly or across a local area or other network. Memory 14 can be distributed across multiple machines such as network-based memory or memory in multiple machines performing the operations of machine learning system 10. Although depicted here as a single bus, bus 16 can be composed of multiple buses. Storage 24 can be directly coupled to the other components of machine learning system 10 or can be accessed via a network and can comprise a single integrated unit such as a disk drive or multiple units such as an array of disk drives. Machine learning system 10 can thus be implemented in a wide variety of configurations.

One of the functions of machine learning system 10 is to generate classifiers that permit machine learning system 10 or another computer to programmatically determine the correct label of a specimen. The classifiers are generated using a dataset such as a dataset 40 of labeled examples. (See, e.g., FIG. 3.) In one illustrative application, machine learning system 10 is used to develop a classifier to distinguish spoken words from an audio signal. Other examples of machine learning applications include, without limitation, machine vision and other machine perception; language processing; pattern recognition including face recognition and handwriting recognition; medical diagnosis, search engines; human-machine interfaces; bioinformatics; detection of fraud; financial and accounting analysis including analysis of markets; face recognition; robotics; and games. The classifiers developed by machine learning system 10 can be deployed in programmed general purpose computers or special purpose devices to render functions in any of the foregoing or other areas.

To aid in the understanding of machine learning system 10 the following mathematical constructs are explained. Machine learning system 10 implements learning in accordance with a range of learning models including the PAC model of learning. In one exemplary embodiment, machine learning system 10 learns a target halfspace $f(x)=\text{sign}(w \cdot x)$, where w is an unknown unit vector and x is an example in a set of examples having an unknown probability distribution D over the unit ball $B_n=\{x \in R^n: \|x\|_2 \leq 1\}$. Unit ball $B_n$ may have support on $\{x \in B_n: |w \cdot x| \geq \gamma\}$. For convenience, the target halfspace $f(x)$ is sometimes referred to as an n-dimensional, $\gamma$-margin halfspace.

As explained below, machine learning system 10 accepts as input at least a portion of a dataset of labeled examples $(x, f(x))$ where each example x is independently drawn from D and $f(x)$ is the label assigned to example x. From this input, machine learning system 10 generates as output a classifier $h: R^n \to \{-1, 1\}$ that in some cases satisfies the condition $\Pr_{x:D}[h(x) \neq f(x)] \leq \epsilon$, where $\epsilon$ is a target accuracy.

Machine learning is sometimes computationally intensive. For example, one known method for machine learning is the Perceptron algorithm, which can run in poly $$\left(n, \frac{1}{\gamma}, \frac{1}{\epsilon}\right)$$

time, using $$O\left(\frac{1}{\epsilon \gamma^2}\right)$$

labeled examples in $R^n$, to learn an unknown n-dimensional $\gamma$-margin halfspace to accuracy $1-\epsilon$.

To reduce the time required for computation, machine learning system 10 performs some operations in parallel. In one exemplary embodiment, machine learning system 10 can learn an unknown n-dimensional $\gamma$-margin halfspace to accuracy $1-\epsilon$ using a number of processors that is a polynominal function of $$\left(n, \frac{1}{\gamma}, \frac{1}{\epsilon}\right)$$

in a time that is a polynomial function of $$\left(\log n, \log \frac{1}{\gamma}, \log \frac{1}{\epsilon}\right).$$

Figure 2:
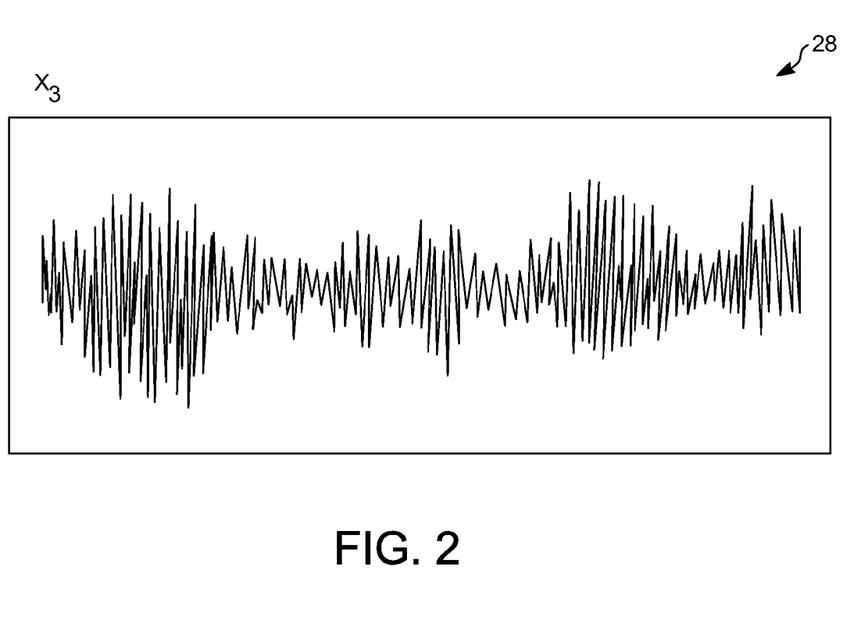
FIG. 2 is a specimen of sampled audio used to create one of the examples in a dataset of labeled examples.

In this example, machine learning system 10 is used to generate a classifier for distinguishing spoken words, phoneme or other units of language. FIG. 2 is a specimen 28 of an audio recording of a human speaker uttering a sound, which for purposes of illustration is the word "A" (as in the sentence "A dog barked."). Specimen 28 is used to create one of the examples ($x_3$ in FIG. 3) in a dataset of N labeled examples ($x_1, \ldots, x_N$ in FIG. 3) that machine learning system 10 will learn. In practice, a dataset of training examples can be created by having humans review specimens such as specimen 28 and assign the specimen with a label such as "A" or "Not A."

An audio recording such as specimen 28 has certain attributes or features, such as frequency or amplitude or transforms of these values which are arbitrarily designated for this example as features $F_1, \ldots, F_n$, where n is the number of dimensions of the labeled examples. These features are associated with the categorization of specimen 28 as an utterance of the word "A" (as in the sentence "A dog barked.") versus some other sound. Many specimens of utterances can be studied and classified, and the results can be summarized in a dataset of training examples such as shown in FIG. 3.

Figure 3:
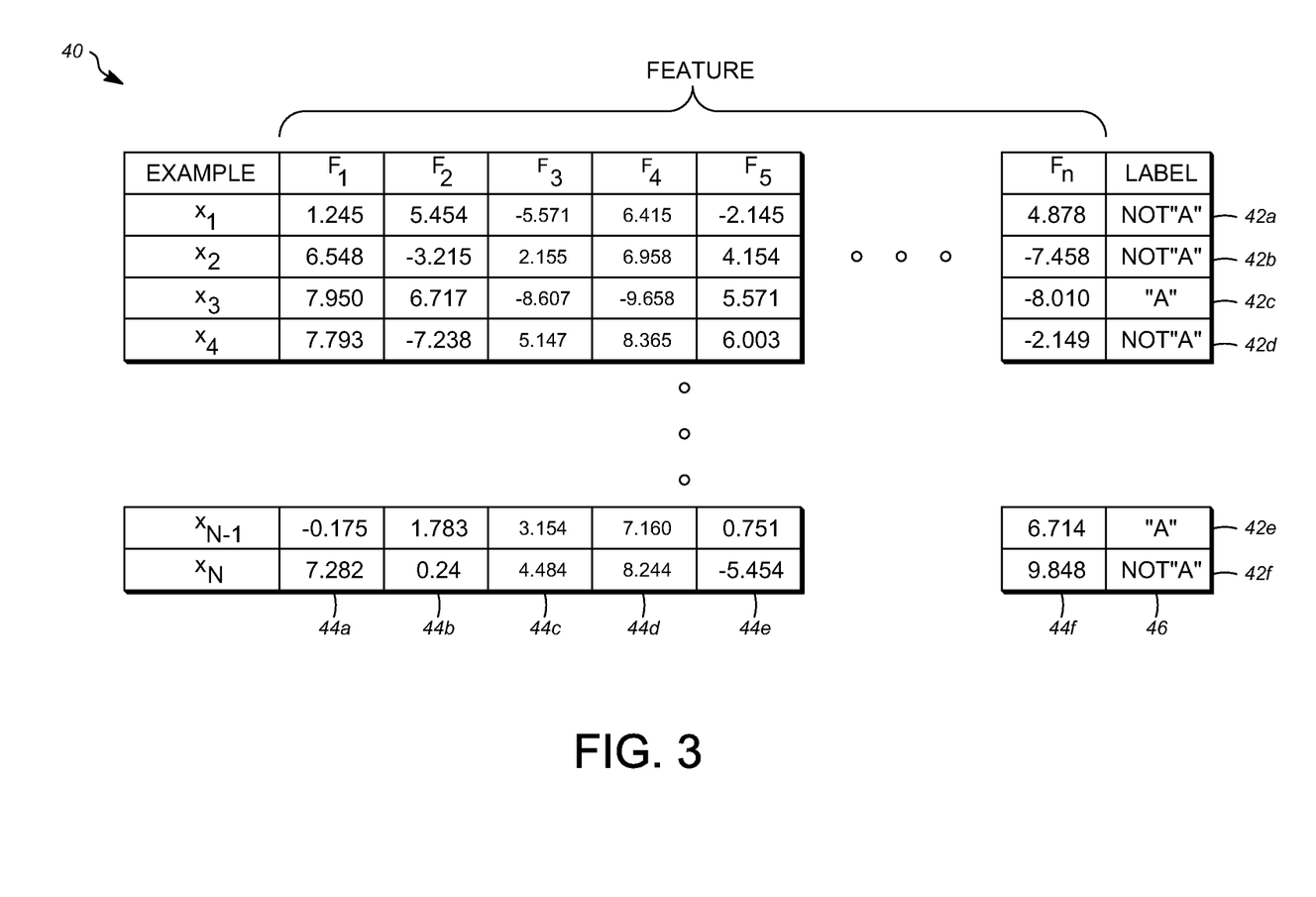
FIG. 3 is a dataset of labeled examples.

FIG. 3 is a table or dataset 40 of N labeled examples. In practice, dataset 40 contains a large number of examples such as 10,000 to 1,000,000 examples $x_1, \ldots, x_N$. Dataset 40 includes rows 42a through 42f (sometimes referred to generally as rows 42), each containing a different one of the examples $x_1, \ldots, x_N$. Columns 44a through 44f (sometimes referred to generally as columns 44) of dataset 40 indicate features or values of features that may be found in each example. For each example x, its features $F_1$ to $F_n$ (columns 44) have a real value. Column 46 indicates the label assigned to each example. The assigned label is either "A" or "Not A" depending on whether the utterance in the example is deemed by the reviewer to be the word "A." Thus, each example x is a vector whose elements are a sequence of real values for each applicable feature $F_1$ to $F_n$.

For example, row 42c of dataset 40 contains the values of example $x_3$. Example $x_3$ is a vector (7.950, 6.717, −8.607, −9.658, 5.571, ..., −8.010) whose elements indicate the real number values of particular features in example $x_3$. Thus, column 44a of row 42c contains a "7.950" indicating that example $x_3$ includes the feature $F_1$ having a value of 7.950.

Machine learning system 10 accepts as input training examples such as dataset 40 and generates as output a classifier which can be used to predict the correct label of new data. The operation of machine learning system 10 is explained below in detail; however, in general terms, machine learning system 10 accomplishes parallel operations as follows. Machine learning system 10 executes a boosting module B as described below in connection with FIG. 4. Boosting module B randomly projects the examples down from n dimensions to d dimensions. Machine learning system 10 then repeatedly calls a weak learner module W to generate weak classifiers based on samples drawn from the random projection.

Figure 4:
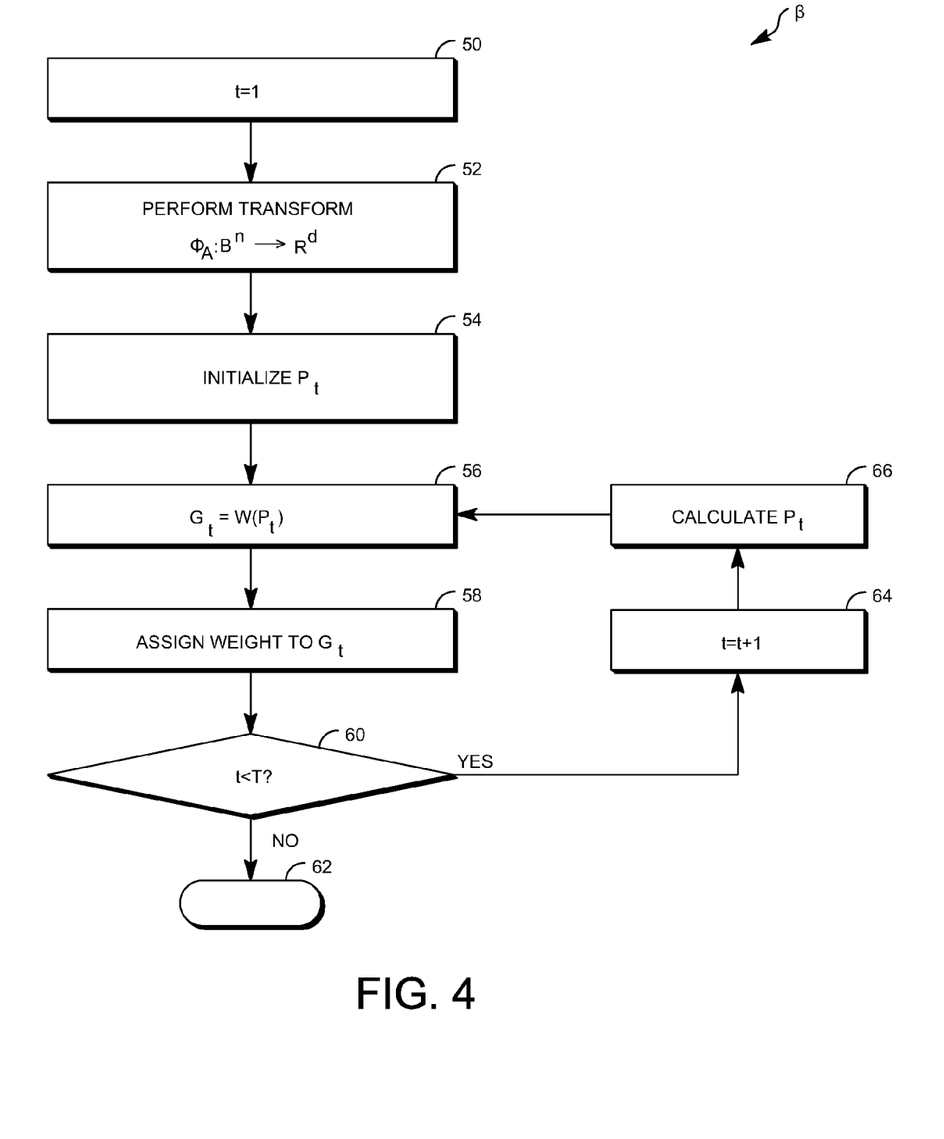
FIG. 4 is a logic flowchart showing the operation of a boosting module B, according to an embodiment of the described subject matter.
Figure 5:
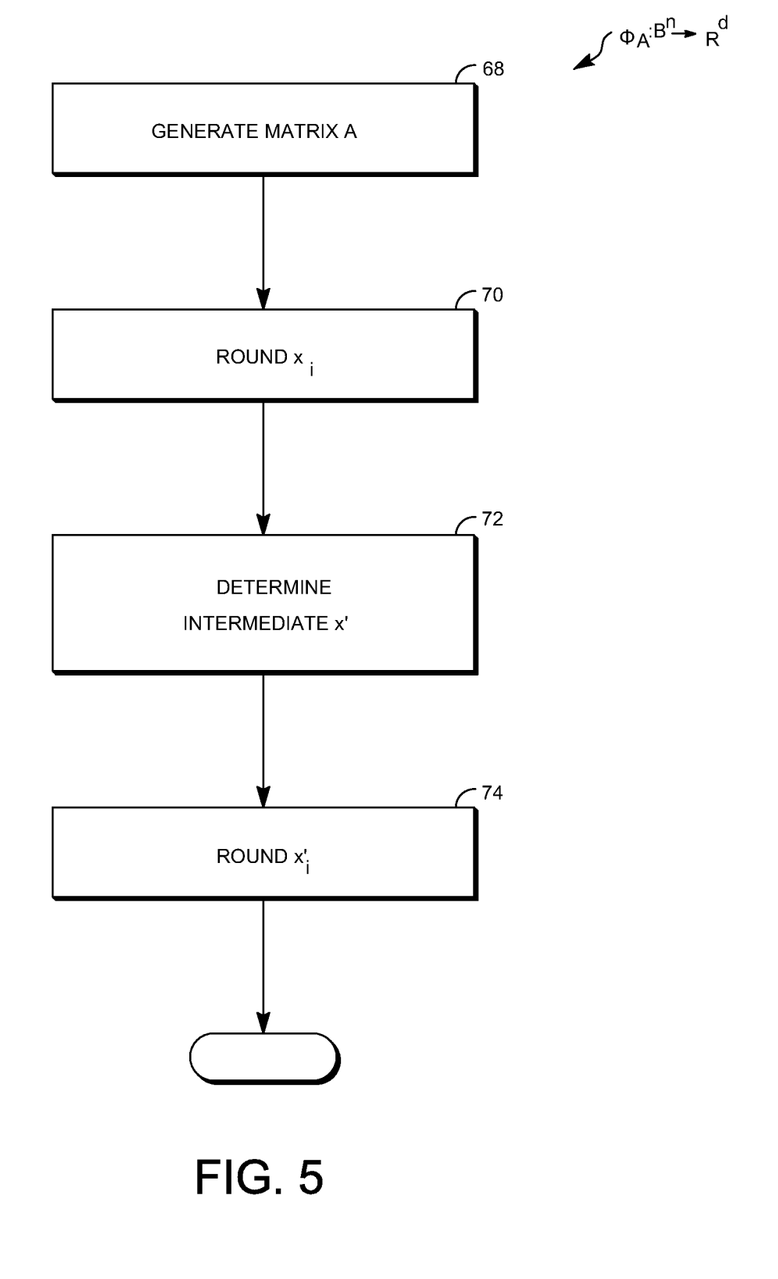
FIG. 5 is a logic flowchart of a transform performed by boosting module B, according to an embodiment of the described subject matter.

FIG. 4 is a logic flow chart illustrating in more detail the operation of boosting module B. The steps of FIG. 4 can be implemented in software resident in memory 14 and executed by one or more of processors 12. For purposes of this illustration, $\epsilon=1/10$, $\delta=1/10$ and (without loss of generality) y=1/integer. At block 50, machine learning system 10 sets variable t equal to one. At a block 52, machine learning system 10 performs a transform $\Phi_A: B^n \to R^d$ on example set x using random projection matrix A. Random projection matrix A reduces the number of dimensions from n to d while rounding the intermediate values of the matrix to manage bit complexity. The resulting transform is sometimes referred to herein as $R^d$. In some cases, this random projection can preserve at least some of the geometry of the original dataset so that at least some of the resulting d-dimensional labeled examples are still linearly separable with margin $\Theta(\gamma)$. In one exemplary embodiment, the transform $\Phi_A: B^n \to R^d$ is performed as illustrated in FIG. 5 described below.

At block 54, machine learning system 10 initializes a probability distribution $P_t$ as a uniform distribution. At block 56, machine learning system 10 calls a weak learner module W, passing the probability distribution $P_t$ as an argument. Weak learner module W returns a classifier in the form of a vector w (see FIG. 6). Machine learning system 10 stores the output of weak learner module W as $G_t$, the $t^{th}$ element in an array of vectors G. Array G is the ultimate boosted classifier that is the output of machine learning system 10. With each iteration of boosting module B, the array G grows by the incremental $t^{th}$ element. At block 58, machine learning system 10 assigns a weight to $G_t$ based on the accuracy achieved by $G_t$ over a set of examples (which accuracy can also be returned as output by weak learner module W).

At block 60, machine learning system 10 determines whether the variable t is less than T, a predetermined constant. The value of T is selected based on the number of iterations of boosting module B that are to be performed. Generally, the more iterations of boosting module B, the greater the accuracy of boosted classifier G. If t is not less than T, then processing of boosting module B terminates at a block 62. The final boosted classifier G will contain T elements, each being a weighted weak classifier (as generated by weak learner module W). The final boosted classifier G can be applied to an unknown example, and the label of the unknown example will be generated by classifier G as the weighted results of each weak classifier $G_1, \ldots G_T$.

If at block 60 t is less than T, then at block 64 machine learning system 10 increments t by one. At block 66, machine learning system 10 calculates a new probability distribution $P_t$. The specific methodology for calculating $P_t$ can depend on the type of boosting algorithm employed by boosting module B. Machine learning system 10 then calls weak learner module W at block 56 and the processing continues through another iteration of blocks 56 through 66 as described above.

FIG. 5 is a logic flowchart showing the transform $\Phi_A: B^n \to R^d$ which takes place at block 52 in FIG. 4. The transform begins at block 68 at which machine learning system 10 selects an n×d random projection matrix A where n is the original number of features or dimensions of the labeled examples x and $d=O(\log(1/\gamma)/\gamma^2)$. The values of matrix A are random numbers. At block 70, machine learning system 10 rounds each $x_i$ of the example set x to the nearest integer multiple of $$1/(4\lceil \sqrt{n/\gamma} \rceil).$$

An example of rounding to the nearest integer multiple would be rounding a value of 1.623 to 162/100. At block 72, machine learning system 10 determines an intermediate transform matrix $$x' = (1/2\sqrt{d})xA,$$

where x' is the result of rounding x at block 68. At block 74, machine learning system 10 rounds each $x'_i$ to the nearest multiple of $1/(8\lceil d/\gamma \rceil)$, resulting in a d-dimensional space or example set that is the n- to d-dimensional transformation of the n-dimensional set of examples x. For a given set of examples x, machine learning system 10 can compute $\Phi_A(x)$ using $O(n \log(1/\gamma)/\gamma^2)$ processors in $O(\log(n/\gamma))$ time.

Figure 6:
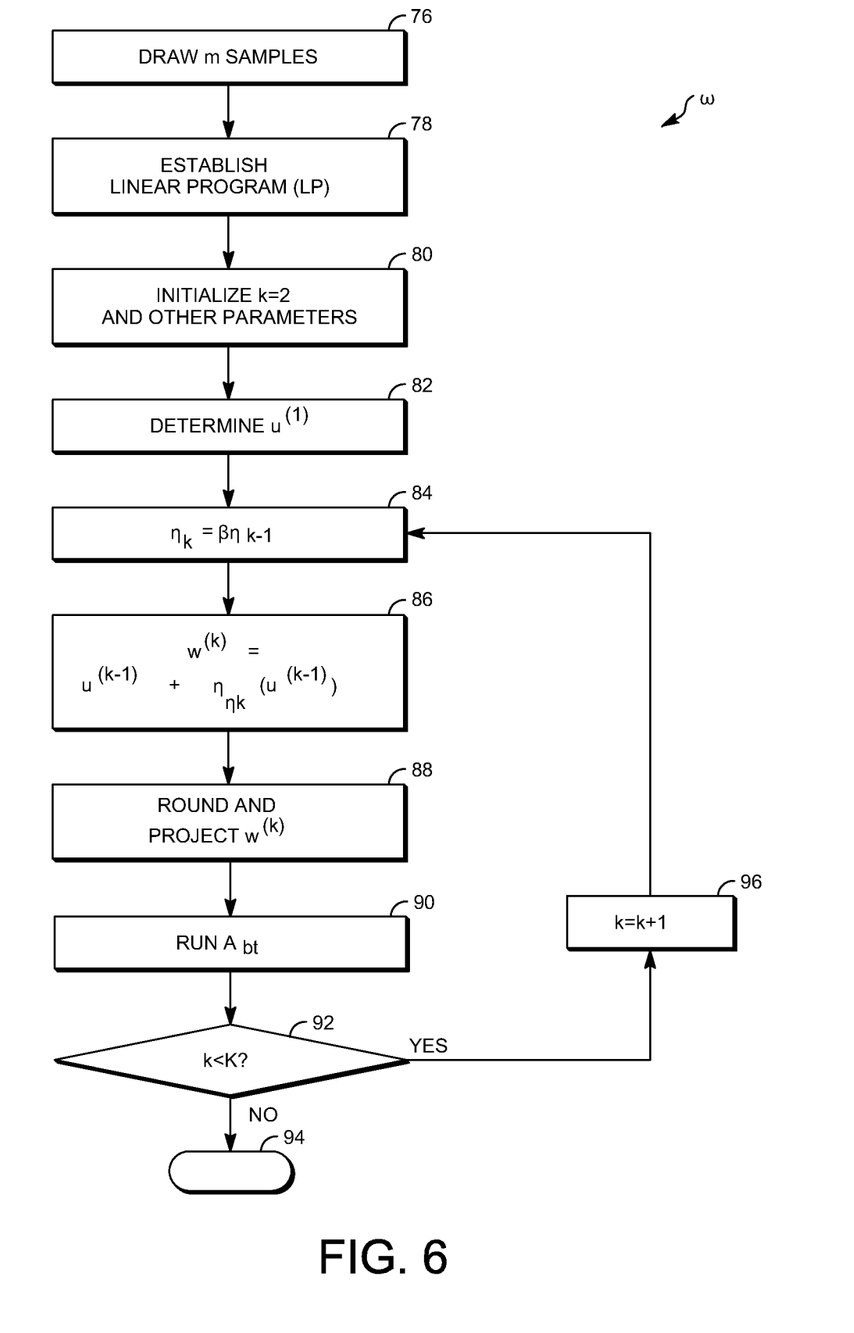
FIG. 6 is a logic flowchart showing the operation of a module W, according to an embodiment of the described subject matter.

FIG. 6 is a logic flow chart showing the operation of the weak learner module W which is called by boosting module B at block 56 of FIG. 4. In general terms, the weak learner module W draws m examples from the d-dimension transform examples. Weak learner module W then solves linear programs with m constraints (based on the drawn sample) to acceptable accuracy using multiple stages of Newton's method. A suitable linear program can be Renegar's algorithm. Machine learning system 10 can employ parallel algorithms for linear algebra to carry out at least some stages of Newton's method. In one illustrative embodiment, this parallel processing can be carried out in polylog($1/\gamma$) parallel time steps. This suffices to learn the unknown halfspace to constant accuracy (such as for, example, accuracy of $9/10$).

Referring to FIG. 6, at block 76, machine learning system 10 draws m labeled training examples $(\Phi_A(x), f(x))$ from D', the transformation of the distribution D. In this example, m is equal to $c\log(1/\gamma)/\gamma^2$. The m examples are drawn using probability distribution $P_t$ as provided to weak learner module W by boosting module B. In some embodiments, the drawing of m labeled training examples can be done in $O(\log(n/\gamma))$ time using $O(n) \cdot \text{poly}(1/\gamma)$ processors.

At block 78, machine learning system 10 determines a linear program LP as follows. Given $(x'_1, y_1), \ldots, (x'_m, y_m) \in B_d \times \{-1, 1\}$, a linear program LP, with $\alpha = \gamma'/2$ is:

minimize $-s$ such that $y_t(v \cdot x_t) - s_t = s$ and $0 \leq s_t \leq 2$ for all $t \in [m]$; $-1 \leq v_i \leq 1$ for all $i \in [d]$; and $-2 \leq s \leq 2$, where s is the minimum margin over all examples, and $s_t$ is the difference between each example's margin and s. The subspace L is defined by the equality constraints $y_t(v \cdot x_t) - s_t = s$.

With LP established, at block 80 machine learning system 10 initializes a variable k and other parameters. The variable k is set equal to 2. The constant K (which determines the number of iterations of weak learner module W) is equal to $$1 + \left\lceil \frac{\log(4d/\alpha)}{\log(\beta)} \right\rceil.$$

Other parameters are initialized as follows: $\eta_1 = 1$, $$\beta = 1 + \frac{1}{8\sqrt{2d}}$$

and $$\varepsilon = \frac{1}{\left\lceil 2\sqrt{d}\left(5d/\alpha + \sqrt{d}\, 2^{10d/\alpha + 2d + 1}\right)\right\rceil}.$$

A precision parameter $\alpha$ is set based on desired bitwise precision.

At blocks 82 through 96 as described below, weak learner module W will accept a matrix u as input and, using linear programming, generate as output $u^{(k)}$ after k iterations, where the final output will include a weak classifier in the first d elements $u^{(k)}_1, \ldots u^{(k)}_d$. The input matrix u has as its first elements $u_1, \ldots, u_d$ a set of weightings generated at block 78. These d weights are a crude classifier of the d dimensions of the transformed example set. Input matrix u has as its next m elements $u_{d+1}, \ldots, u_{d+m}$ values corresponding to each of the m examples. The remaining j elements $u_{d+m+1}, \ldots, u_{d+m+j}$ of input matrix u are values used by linear programs as slack or margins variable such as s described above. These margin variables measure the margin by which the linear program has succeeded in correctly classifying all of the examples. If the margin variable is positive and large, then all of the examples have been classified correctly by a large margin. If the margin variable is negative, then some example is classified incorrectly, and if the margin variable is positive but small, then all examples have been classified correctly, but at least one variable is classified correctly with only a small margin.

At block 82, a subroutine $A_{bt}$ is called to generate $u^{(1)}$ taking u as input. Subroutine $A_{bt}$ is known in the art and is taught, for example, at Section 9.6.4 of S. P. Boyd and L. Vandenberghe, *Convex Optimization*, Cambridge 2004. In general terms, subroutine $A_{bt}$ accepts as input a preliminary solution to a convex optimization problem (in this case u) and outputs a solution for which the Newton decrement step is relatively small. In some cases, the properties of $A_{bt}$ can be stated mathematically as follows: Suppose for any $\eta > 0$, $A_{bt}$ is given u with rational components such that $F\eta(u) - \text{opt}\eta \leq p2$. After many iterations of Newton's method and back-tracking line search, $A_{bt}$ returns u+ that (i) satisfies $\|n\eta(u+)\|u+ \leq 1/9$; and (ii) has rational components that have bit-length bounding by a polynomial in d, the bit length of u, and the bit length of the matrix A such that $L = \{v : Av = 0\}$ In some exemplary embodiments, $u^{(1)}$ can meet the following criteria: $\|n_{\eta_1}(u^{(1)})\|_{u^{(1)}} \leq 1/9$. After generating $u^{(1)}$, the weak learner module M iterates blocks 84 through 96 to improve the accuracy of the classifier containing the first d elements of $u^{(k)}$. At block 84, machine learning system 10 calculates $\eta_k = \beta \eta_{k-1}$. At block 86, machine learning system 10 calculates $w^{(k)}$, an intermediate value of $u^{(k)}$ equal as follows:

$$w^{(k)} = u^{(k-1)} + n_{\eta k}(u^{(k-1)})$$

The computation of $w^{(k)}$ involves computing one step of Newton's method (as indicated by the notation n). This computation can be performed in parallel using processors 12. For example, Newton's method requires the performance of matrix inversion, which can be accomplished using Reif's algorithm as is understood by those skilled in the art. The performance of Reif's algorithm can be done in parallel.

At block 88, machine learning system 10 computes $r^{(k)}$ by rounding each component of $w^{(k)}$ to the nearest multiple of $\epsilon$, and then projecting back onto L, the subspace described above in connection with block 78. At block 90, machine learning system 10 runs subroutine $A_{bt}$ starting with $r^{(k)}$ to obtain $u^{(k)}$. At block 92, a determination is made as to whether k is less than K. If k is not less than K, processing of weak learner module W terminates at block 94. Otherwise, if k is less than K, then machine learning system 10 increments k by one at block 96. Machine learning system 10 then re-performs the processes of blocks 84 through 92 as just described. When weak learner module W terminates at block 94, it returns to booster module B a weak classifier that is extracted as the first d elements of vector $u^{(k)}$.

The functions described in connection with FIGS. 4-6 can be incorporated as an application computer program stored in memory 14 of machine learning system 10 (FIG. 1). Alternatively, the logic of modules B, W and $A_{bt}$ can be implemented in hardware such as in firmware or on an ASIC or other specialized chip. All or a portion of the embodiments of the present invention can take the form of a computer program product accessible from, for example, a computer-usable or computer-readable storage medium such as memory 14 or storage 24. A computer-usable or computer-readable storage medium can be any device that can, for example, tangibly contain, store, communicate, or transport the program for use by or in connection with any processor. The medium can be, for example, an electronic, magnetic, optical, electromagnetic, or a semiconductor device or signal. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

The invention claimed is:

1. A method for using one or more processors to generate a classifier from n-dimensional examples, comprising:
   storing in a computer memory at least some of the n-dimensional examples;
   determining a plurality of d-dimensional examples using a random projection of the at least some n-dimensional examples in the computer memory including:
      identifying an n×d random projection matrix A;
      determining an intermediate d-dimensional set of examples by performing a matrix multiplication of the projection matrix A and at least some of the n-dimensional examples; and
      rounding at least some members of the intermediate d-dimensional set of examples to generate the plurality of d-dimensional examples;
   drawing a set of examples from the plurality of d-dimensional examples;
   using at least one processor to perform at least one linear program operation using as constraints at least some of the set of examples drawn from the plurality of d-dimensional examples; and
   generating a classifier based on the solution of the at least one linear program operation.

2. The method of claim 1, wherein determining a plurality of d-dimensional examples further comprises:
   rounding at least some of the n-dimensional examples to a nearest integer multiple of a value determined as a function of n before determining the intermediate d-dimensional set of examples; and wherein rounding at least some members of the intermediate d-dimensional set of examples further comprises:
   rounding the at least some members to a nearest multiple of a value that is a function of d.

3. The method of claim 2, wherein the value determined as a function of n is equal to $$1/(4\lceil \sqrt{n/\gamma} \rceil),$$

where $\gamma$ is the margin of at least some of the n-dimensional examples.

4. The method of claim 2, wherein the value determined as a function of d is equal to $1/(8\lceil d/\gamma \rceil)$, where $\gamma$ is the margin of at least some of the n-dimensional examples.

5. The method of claim 1, wherein the n dimensions of the examples in the dataset correspond to n features indicative of a class into which at least some of the examples are assigned.

6. The method of claim 1, wherein the set of examples drawn from the plurality of d-dimensional examples is of a size m that is a function of $\gamma$, where m is an integer with a value less than or equal to d and $\gamma$ is the margin of at least some of the n-dimensional examples.

7. The method of claim 6, wherein m is equal to a logarithmic function of $(1/\gamma)/\gamma^2$.

8. The method of claim 1, wherein using at least one processor to perform at least one linear program operation further comprises:
   using a plurality of iterations of Newton's method to generate at least one output of the linear program operation.

9. The method of claim 8, wherein at least two of the plurality of iterations of Newton's method are performed in parallel using different processors.

10. The method of claim 8, further comprising rounding the at least one output of the linear program operation to a nearest integer multiple of a value that is a function of d.

11. The method of claim 10, wherein the value that is a function of d is a function of $\log(1/\gamma)/\gamma^2$.

12. The method of claim 8 wherein the number of iterations is a function of $$\left\lceil \frac{\log(4d/\alpha)}{\log(\beta)} \right\rceil,$$

where $\alpha$ is a selected precision parameter and $\beta$ equals $$1 + \frac{1}{8\sqrt{2d}}.$$

13. An apparatus for generating a weak classifier from n-dimensional examples in a dataset, comprising:
   a memory containing at least some of the n-dimensional examples; and
   a computing system having at least one processor coupled to the memory and configured to:
   determine a plurality of d-dimensional examples using a random projection of at least some of the n-dimensional examples, where d is less than n, by performing the following method:
      identifying an n×d random projection matrix A;
      rounding at least some of the n-dimensional examples to a nearest integer multiple of a value determined as a function of n;
      determining an intermediate d-dimensional space by performing a matrix multiplication of the projection matrix A and at least some of the rounded examples; and
      rounding at least some members of the intermediate d-dimensional space to a nearest multiple of a value that is a function of d;
   draw a set of examples from the d-dimensional space;
   solve at least one linear program operation using as constraints at least some of the set of examples drawn from the d-dimensional space; and
   generate a classifier based on the solution of the at least one linear program operation.

14. The apparatus of claim 13, wherein the computing system is further configured to perform at least one linear program operation by using a plurality of iterations of Newton's method to generate at least one output of the linear program operation.

15. The apparatus of claim 13, wherein the computing system includes at least two processors, and wherein at least two of the plurality of iterations of Newton's method are performed in parallel using the at least two processors.

16. A non-transitory computer storage medium encoded with a computer program, the program comprising:
   instructions that when executed by a data processing apparatus cause the data processing apparatus to perform operations comprising:
      storing in a computer memory at least some n-dimensional examples;

determining a d-dimensional space using a random projection of the at least some n-dimensional examples;

drawing a set of examples from the d-dimensional space;

solving at least one linear program operation using constraints based on at least some of the set of examples drawn from the d-dimensional space wherein the set of examples drawn from the plurality of d-dimensional examples is of a size m that is a function of $\gamma$; where m is an integer with a value less than or equal to d and $\gamma$ is the margin of at least some of the n-dimensional examples; and generating a classifier based on the solution of the at least one linear program.

17. The non-transitory computer storage medium of claim 16, wherein determining a d-dimensional space further comprises:

identifying an n×d random projection matrix A;

rounding at least some of the examples to a nearest integer multiple of a value determined as function of n;

determining an intermediate d-dimensional space by performing a matrix multiplication of projection matrix A and at least some of the rounded examples; and rounding at least some members of the intermediate d-dimensional space to a nearest multiple of a value that is a function of d.

18. The non-transitory computer storage medium of claim 16, wherein the medium further comprises instructions that cause the data processing apparatus to solve the at least one linear programming operation using a plurality of iterations of Newton's method to generate at least one output of the linear program operation.

19. The non-transitory computer storage medium of claim 16, wherein d is less than n.

20. The non-transitory computer storage medium of claim 16 wherein the value determined as a function of n is equal to one of $$1/(4\lceil \sqrt{n/\gamma} \rceil)$$

or $1/(8\lceil d/\gamma \rceil)$, where $\gamma$ is the margin of at least some of the n-dimensional examples.

* * * * *